United States Patent [19]
Tatar

[11] Patent Number: 5,299,682
[45] Date of Patent: Apr. 5, 1994

[54] EYEGLASS STORAGE AND PROTECTION DEVICE THAT CAN FUNCTION TO SECURE EYEGLASSES WHILE EYEGLASSES ARE WORN

[76] Inventor: Eric L. Tatar, 339 Cumberland, San Francisco, Calif. 94114

[21] Appl. No.: 96,444

[22] Filed: Jul. 26, 1993

[51] Int. Cl.⁵ .......................... B65D 85/38; G02C 3/02
[52] U.S. Cl. .......................................... 206/5; 351/156; 351/158
[58] Field of Search ............... 206/5, 6; 351/156, 158; 383/4

[56] References Cited

U.S. PATENT DOCUMENTS

| | | | |
|---|---|---|---|
| 4,606,453 | 8/1986 | Burns | 206/5 |
| 4,953,695 | 9/1990 | Tallman | 206/5 |
| 5,014,846 | 5/1991 | Walker et al. | 206/5 |
| 5,102,216 | 4/1992 | Mitchell | 206/5 |
| 5,151,778 | 9/1992 | Conley | 206/5 |

*Primary Examiner*—Jimmy G. Foster

[57] ABSTRACT

This invention combines the functions of an eyeglass protection and storage device with the functions of an eyeglass securing device for when the eyeglasses are being worn. After the eyeglasses are removed from the protection and storage enclosure of this invention, the device can be transformed into a strap and used to secure the eyeglasses around the head of the wearer. Since such a dual-use protection and storage device can be worn along with the glasses, this invention also serves to eliminate the need to carry separately a single-use protection and storage device while the eyeglasses are being worn.

2 Claims, 3 Drawing Sheets

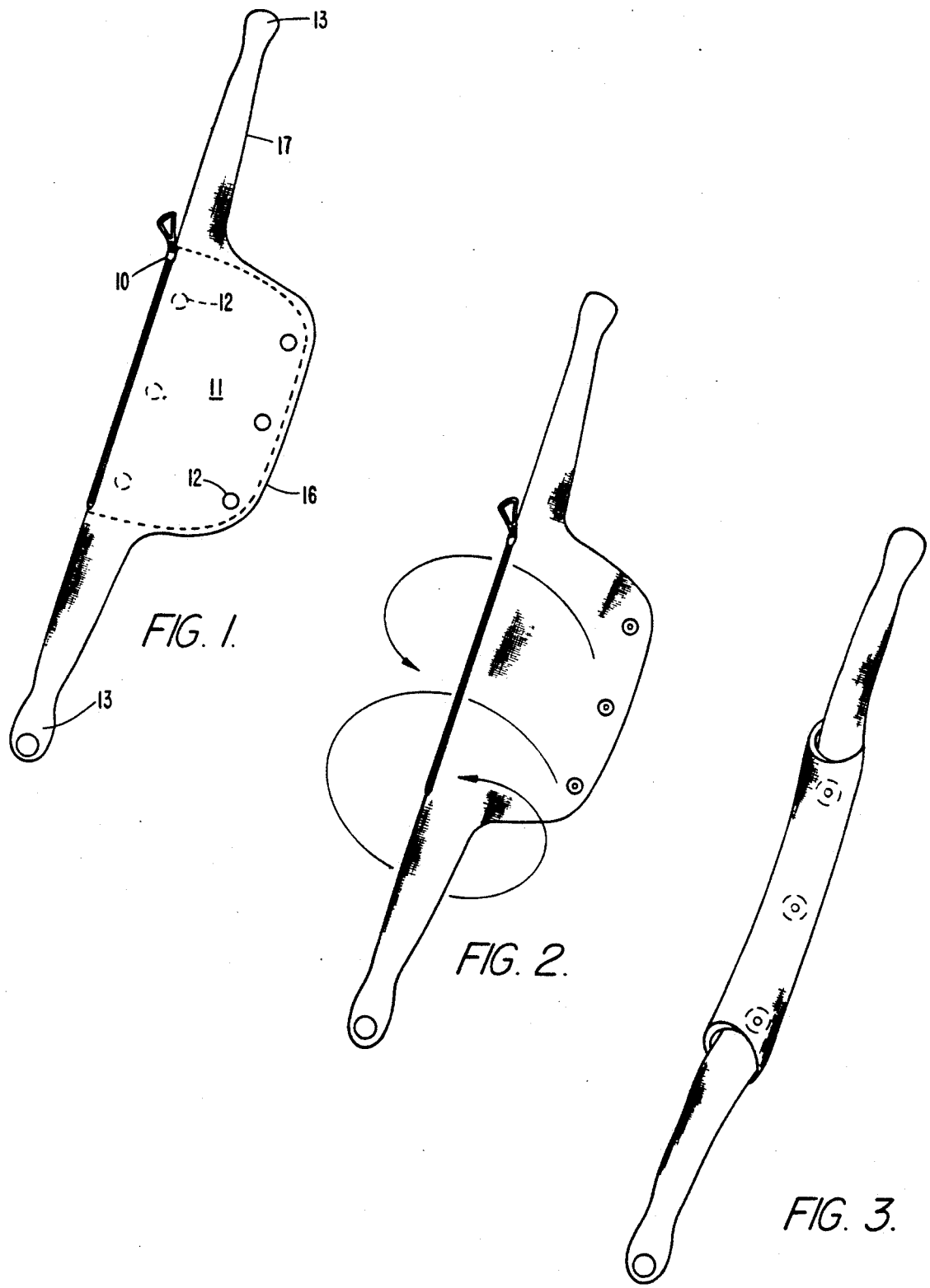

EYEGLASS STORAGE AND PROTECTION DEVICE THAT CAN FUNCTION TO SECURE EYEGLASSES WHILE EYEGLASSES ARE WORN

BACKGROUND OF INVENTION

Many products of various rigidities and strengths serve as containers that protect eyeglasses from being crushed and/or having their lenses scratched while these eyeglasses are not being worn. Many products also exist that serve to secure eyeglasses to the person wearing the eyeglasses. Devices that secure eyeglasses are those comprised of a strap worn behind the head and attached to the 'temple' of the eyeglasses by means of a fastening device, thereby preventing the eyeglasses from falling off the wearer.

SUMMARY OF INVENTION

It is an object of this invention to combine the functions of an eyeglass protection and storage device with the functions of an eyeglass securing device. After the eyeglasses are removed from the protection and storage enclosure of this invention, the device can be transformed into a strap and used to secure the eyeglasses to the head of the wearer. Since such a dual-use device can be worn along with the glasses, this invention also serves to eliminate the need to carry separately a single-use protection and storage device while the eyeglasses are being worn.

DESCRIPTION OF THE DRAWINGS

Other advantages and objects of this invention will become apparent from the following description and accompanying drawings wherein:

FIG. 1 is a view of the invention unfurled for eyeglass storage and protection.

FIG. 2 demonstrates transformation of the storage and protection form into the eyeglass securing form.

FIG. 3 represents the invention having been transformed into the eyeglass securing form.

Figure 4:
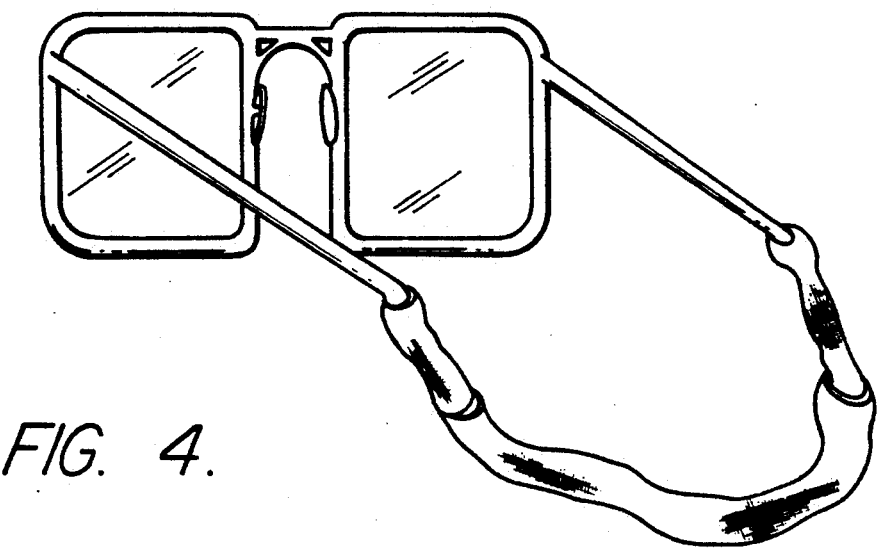
FIG. 4 demonstrates attachment of the invention to the temple of eyeglasses.
Figure 5:
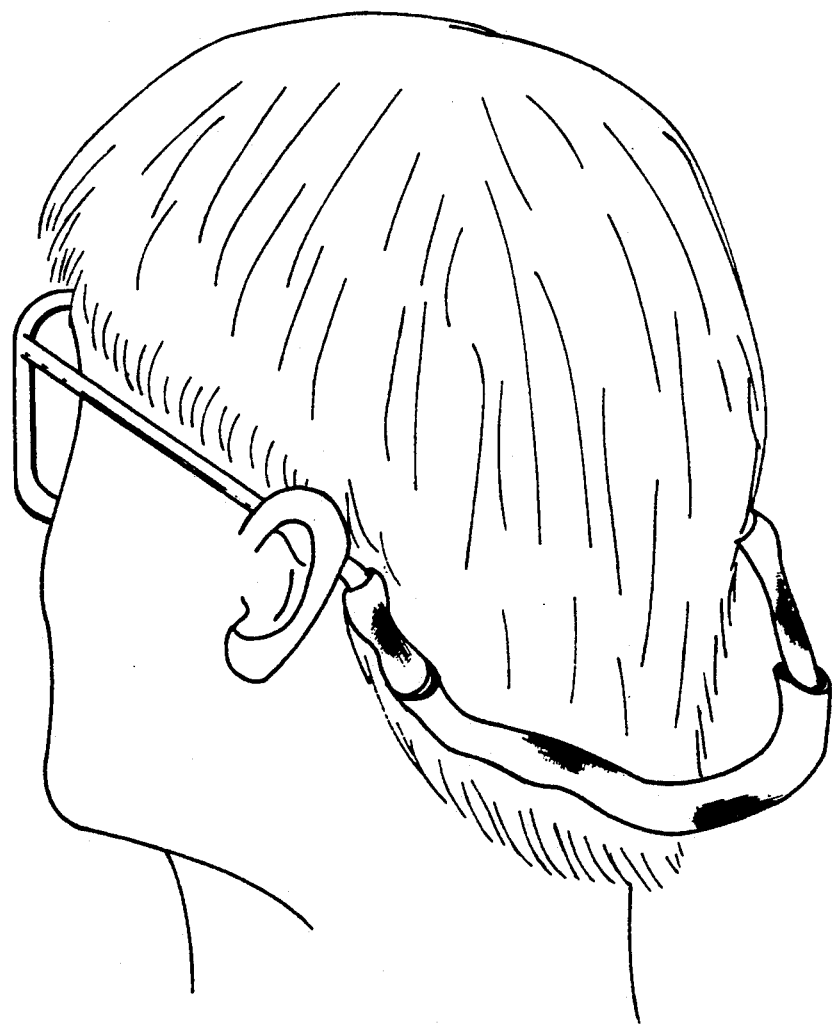
FIG. 5 demonstrates human use of this invention as a means of securing eyeglasses.
Figure 6:
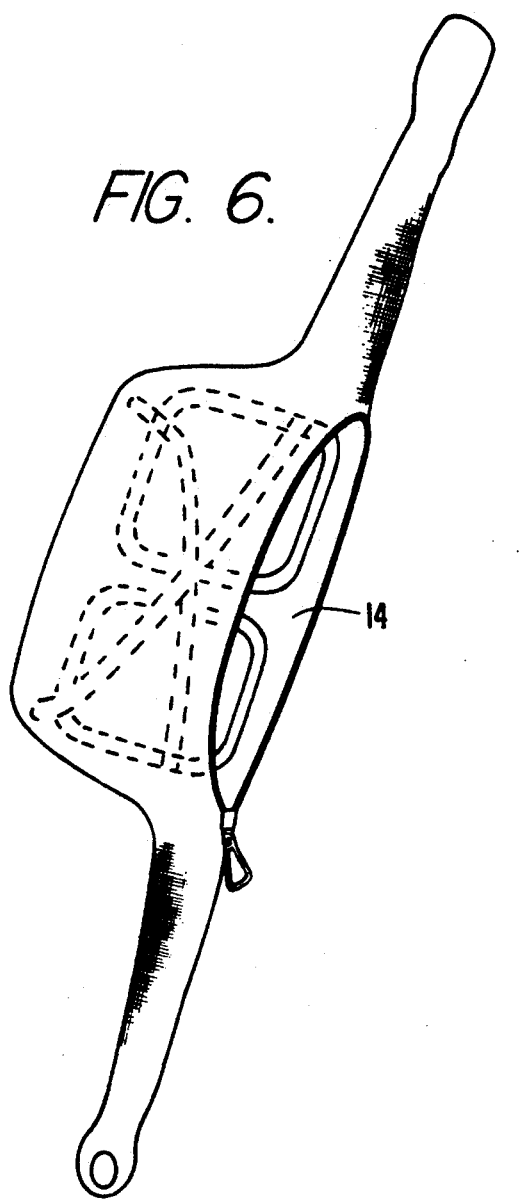
FIG. 6 is a perspective of this invention demonstrating eyeglasses in storage without the enclosure secured.
Figure 7:
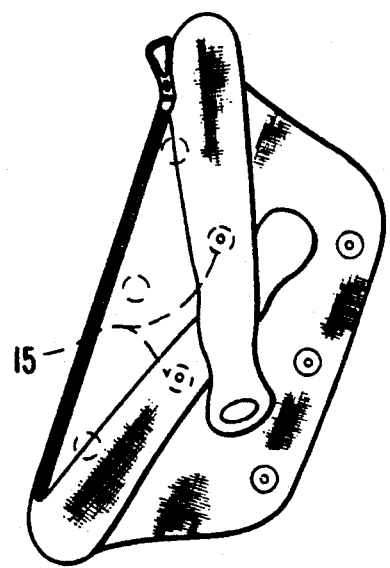
FIG. 7 demonstrates a potential method of fastening the extensions of this invention to the enclosure portion while the invention is in eyeglass storage and protection form.

Referring now to the drawings in greater detail, the reference numeral 10 represents a means of securing the storage and protection enclosure 11 wherein eyeglasses can be put, numeral 10 is a zipper in this representation; numeral 12 represents a means of fastening the invention into the eyeglass securing form once it has been wound (see FIG. 2), in this illustration, numeral 12 is represented by snaps; Numeral 13 represents a means of fastening the extensions 17 of this invention to the temples of eyeglasses (as in FIG. 4), numeral 13 are represented by an elastic cylinder covered by fabric which fits snugly onto the ends of the temple; Numeral 14 represents the interior of the enclosure which may be lined with a material that gives added protection to the eyeglasses while stored in the enclosure. Numeral 15 represents additional snaps that can fasten the extensions of this invention while in the storage and protection mode.

DETAILED DESCRIPTION OF THE INVENTION

This invention is an eyeglass storage and protection device that can function to secure eyeglasses while eyeglasses are worn. The said term "eyeglasses" refers to sunglasses, bifocals, or any lense mounted on a frame with temples and used for the expressed purpose of having the lense looked through by the wearer. The invention can be transformed back and forth between two forms or 'modes'. The first form, being the storage and protection mode, is comprised of fabric or materials sewn, stitched, glued, or attached in such a way that there is an enclosure (numeral 16, FIG. 1) in which eyeglasses can be put. Furthermore, there are extensions (numeral 17, FIG. 1) from this enclosure that serve in the second form of this invention as part of a strap for securing the eyeglasses. The enclosure of the storage and protection form can be held closed by a zipper, velcro, or other fastening method. The enclosure may be lined with a substance that gives added protection to the eyeglasses while allowing the enclosure area to be wound during its transformation into the eyeglass securing, or secondary form of this invention. On the outer surface of the enclosure portion of the invention are snaps, velcro, or other fastening devices that allow the enclosure portion of the invention to be held in place once it is wound around itself and transformed into a strap for securing eyeglasses (see FIGS. 2 & 3). Such fastening devices can be placed on the outer surface of the enclosure as to allow the enclosure portion to be wound clockwise or counterclockwise and then fastened. Once wound and in the eyeglass securing mode (the second form), the invention can be attached to eyeglasses by means of plastic or elastic bands or cylinders at the tips of the extensions, or any other device that fits snugly over the tip of the temple of the eyeglasses. Velcro, straps, snaps, or wire ties may be used to secure the extensions to the tips of the temples. A device may be employed to increase the tension of the eyeglasses as they are secured by the invention by constricting the length of the invention from temple to temple. Lastly, the extensions of this invention while in the storage and protection form, can be tucked or attached to the exterior of the enclosure portion by means of snaps, velcro, or other fastening devices.

I claim:

1. A storage and protection device for eyeglasses, convertible to a securing device for eyeglasses, comprising:
    an enclosure having first and second sides secured to each other to define a pocket which is sized and shaped for receiving eyeglasses therein;
    means for selectively closing said pocket;
    extensions extending from said enclosure in opposite directions, each extension having a free end and means at said free end for securing said extension to a temple of the eyeglasses for securing the eyeglasses to the head of a wearer; and
    fastening means on an exterior surface of each said side, wherein the fastening means on the first side is adapted to fasten to the fastening means on the second side when the enclosure is rolled upon itself, for removably maintaining the enclosure in a rolled configuration;